No. 765,478. PATENTED JULY 19, 1904.
G. H. GRIMM.
SAP SPOUT AND COVER.
APPLICATION FILED APR. 4, 1904.
NO MODEL. 2 SHEETS—SHEET 1.
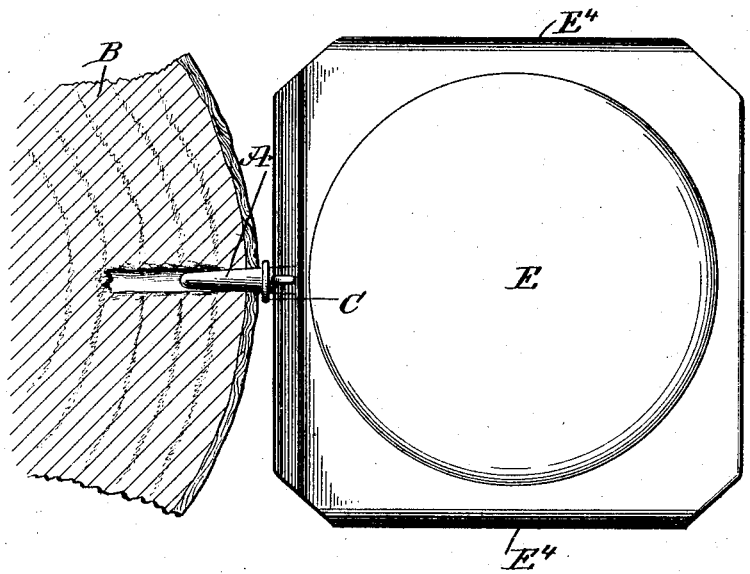
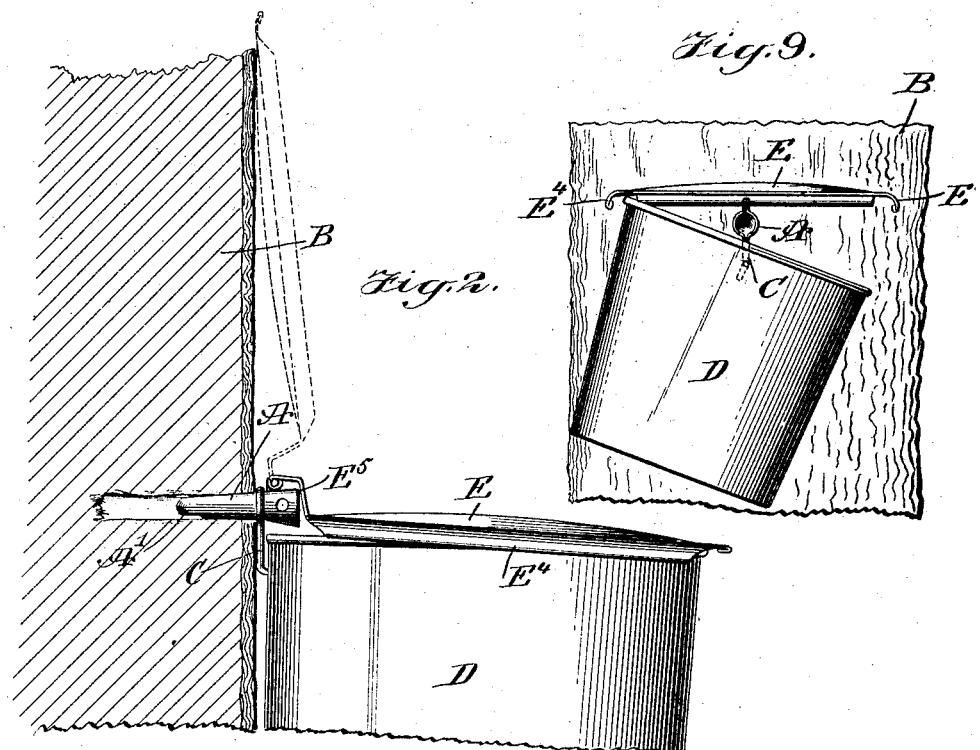
WITNESSES:
INVENTOR
Gustav Henry Grimm
BY
ATTORNEYS No. 765,478. PATENTED JULY 19, 1904.
G. H. GRIMM.
SAP SPOUT AND COVER.
APPLICATION FILED APR. 4, 1904.
NO MODEL. 2 SHEETS—SHEET 2.
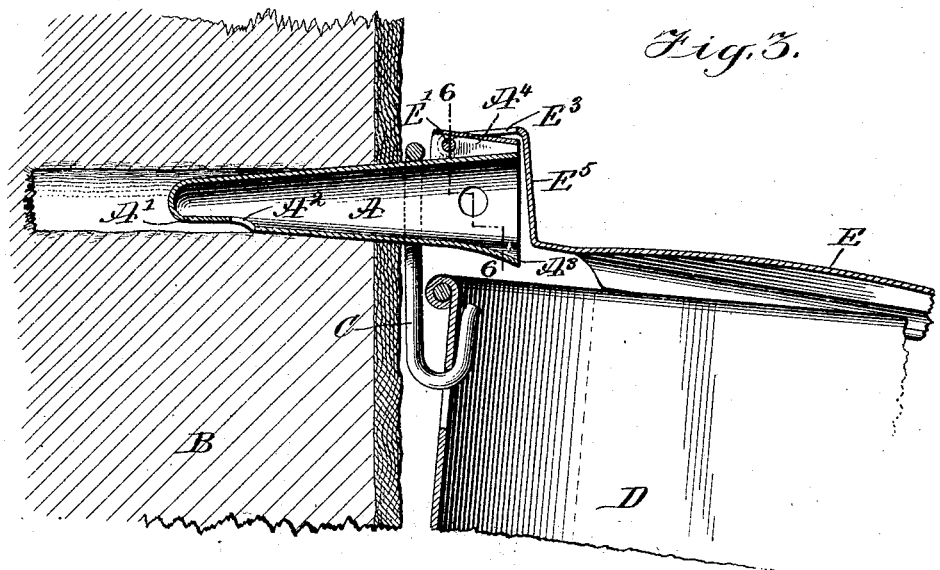
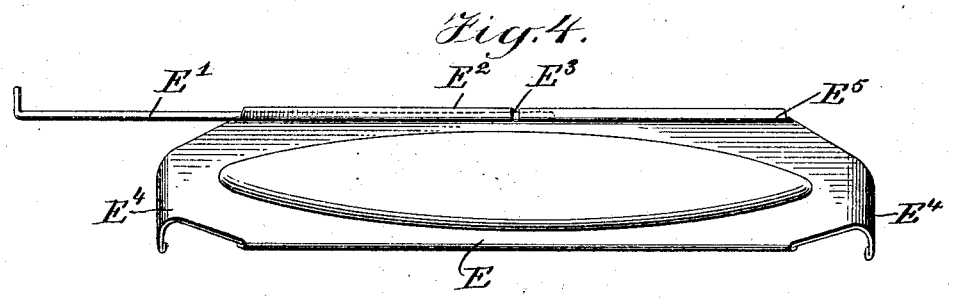
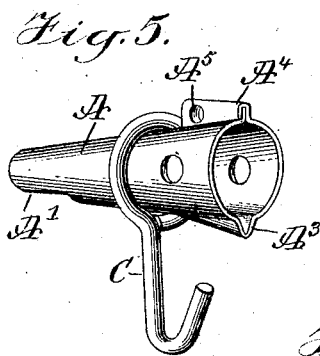
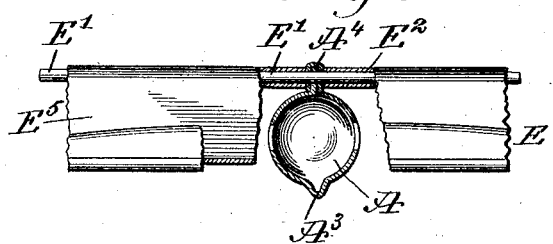
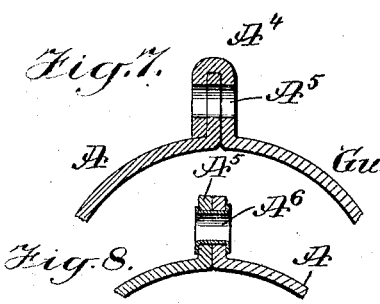
WITNESSES:
INVENTOR
Gustav Henry Grimm
BY
ATTORNEYS No. 765,478. Patented July 19, 1904.

UNITED STATES PATENT OFFICE.

GUSTAV HENRY GRIMM, OF RUTLAND, VERMONT.

SAP-SPOUT AND COVER.

SPECIFICATION forming part of Letters Patent No. 765,478, dated July 19, 1904.

Application filed April 4, 1904. Serial No. 201,443. (No model.)

*To all whom it may concern:*

Be it known that I, GUSTAV HENRY GRIMM, a citizen of the United States, and a resident of Rutland, in the county of Rutland and State of Vermont, have invented a new and Improved Sap-Spout and Cover, of which the following is a full, clear, and exact description.

The invention relates to sap-spouts such as shown and described in the Letters Patent of the United States No. 729,330, granted to me May 26, 1903.

The object of the invention is to provide a new and improved sap-spout and cover for the bucket or like receptacle into which the sap runs from the spout, the arrangement being such that the spout insures a free flow of the sap from the bore, and the cover rises sufficiently on tipping the bucket to allow of emptying the bucket of sap without removing the bucket from the supporting-hook and without the operator being required to manipulate the cover, and the cover protects the contents of the bucket against rain, snow, leaves, and the like, and the cover is firmly supported from the spout and can be readily swung into an open position by the operator to allow inspection of the contents of the bucket and is not liable to be accidentally detached by a strong gust of wind.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a plan view of the improvement in position on the tree, the latter being shown in section. Fig. 2 is a side elevation of the same. Fig. 3 is an enlarged sectional side elevation of the same. Fig. 4 is a perspective view of the cover. Fig. 5 is a like view of the spout and bucket-supporting hook. Fig. 6 is a cross-section of the improvement on the line 6 6 of Fig. 3. Fig. 7 is an enlarged transverse section of part of the spout. Fig. 8 is a like view of a modified form of the same, and Fig. 9 is a reduced front elevation of the improvement as applied and showing the bucket tipped.

The spout A is preferably made from a single piece of metal bent into conical shape and readily passed with its apex end into the bore of a tree B, from which the sap is to be extracted, and the apex end of the spout is closed, and the bottom of the spout near the apex end has a somewhat flattened or pressed-upward portion $A'$, provided with a drain-opening $A^2$ for completely draining the bore of all sap. Now by the arrangement described air is not liable to pass into the bore, as the only communication between the inside of the spout and the bore is by way of the bottom opening $A^2$, which is closed or sealed by the sap within the bore. The portion $A'$, flattened or pressed upward, as described, is out of contact with the corresponding fiber wall of the bore, and thus a sufficient space is formed for the ready passage of the sap to and through the opening $A^2$ to the inside of the spout. Any sawdust left in the bore on boring the same readily drains out through the opening $A^2$ and the spout.

The spout A outside of the tree B is engaged by the eye of a hook C for supporting a bucket D, into which flows the sap from an open drip or trough $A^3$, extending integrally outwardly and downwardly from the bottom portion of the base end of the spout, as plainly illustrated in the drawings, to prevent the drops of sap from running back underneath the spout toward the tree, and thus becoming wasted.

On the top of the spout A, at or near the base or outer end thereof, is arranged a flange $A^4$, extending lengthwise of the spout and provided with a transverse opening $A^5$ or an eyelet $A^6$ (see Fig. 8) for the passage of a pivot-pin or pintle $E'$, removably held in bearings $E^2$, arranged transversely on the top of a cover E, preferably made of sheet metal and serving to close the bucket D, so as to prevent rain, snow, leaves, or the like from passing into the bucket and rendering the sap therein impure.

The cover E is formed with a slot $E^3$ for the passage of the flange $A^4$, the slot separating the bearings $E^2$, which are located adjacent to the rim of the cover E, and this rim may be reinforced by a double seam, a wire, or other filling. The pin E' forms the fulcrum of the cover to allow of swinging the cover into an open position against the tree, as indicated in dotted lines in Fig. 2, to permit convenient and ready inspection of the contents of the bucket D.

The cover E has the sides $E^4$ of its rim bent downwardly to extend downwardly beyond the upper edge of the bucket D, and thus prevent lateral movement of the cover on the bucket and to completely protect the contents of the bucket. The outer end of the cover E is adapted to rest on the top of the rim of the bucket D, while the inner end is supported from the spout, and the slot $E^3$ for the flange $A^4$ is sufficiently large to allow enough play of the cover E on the hook for the cover to move with the bucket D when the latter is swayed by the wind.

The pivotal end of the cover E is preferably connected with the body of the cover by an offset $E^5$, arranged to extend in front of the base end of the spout A to prevent leaves, &c., from being blown into the spout to clog the same and to prevent the wind from interfering with the free outward flow of the sap and also to prevent drying of the bore.

By painting the faces of the cover with contrasting colors or otherwise marking the same to distinguish one face from the other the gatherer of the sap after he has emptied the bucket can by removing the cover and laying it upside down on the bucket indicate at once which of the buckets in the woods have been emptied while making the round.

It is understood that by the arrangement described snow, rain, and all foreign matter is kept from the sap passing into the bucket D to insure a better quality of syrup and sugar, at the same time saving fuel when the sap is boiled. It is further understood that a well-fitting cover is very essential in obtaining a full run of sap free from impurities, as the best runs of sap usually occur during snow and rain storms, and by the ordinary manner of collecting the sap, as now practiced, a large amount of such sap is wasted.

By the arrangement described the bucket D, hung on the hook C, can be readily swung over to one side whenever it is desired to empty the bucket of its contents, (see Fig. 9,) and when swinging the bucket over then the rim of the bucket at the rising side acts on the rim of the cover to swing the latter upwardly, thus raising the cover sufficiently to allow a free discharge of the sap from the bucket without hindrance by the cover and without the operator being compelled to raise the cover by hand, thus leaving the operator's hands free to properly manipulate the bucket D and the vessel into which the sap is to be poured from the bucket D. When it is desired to remove the cover, it is only necessary to withdraw the pin E' and lift the cover E off the bucket D.

In practice the spout A is made from a single piece of sheet metal bent into the conical form shown, the meeting edge or joint of the size of the piece of sheet metal extending lengthwise on the top of the spout, the said joint being preferably closed by solder. The flange $A^4$ is formed by integral portions on the sides of the piece of sheet metal, the portions lying side by side and one of the portions being provided with an integral extension bent transversely over the other portion (see Figs. 5 and 7) to securely unite the portions to form the flange $A^4$. The portions of the flange united as described prevent opening of the joint of the spout in case the solder should give way when the spout is driven into the base of the tree. Instead of bending the extension of one flange portion over the other flange portion to fasten the flange portions together I may use an eyelet $A^6$, extending transversely through the flange portions, as plainly indicated in Fig. 8.

Having thus described my invention, I claim as new and desire to secure by Letters Patent—

1. A sap-spout of approximately conical shape and having the under side of its apex end flattened and formed at the inner end of the flattened portion with an inlet-opening for the sap.

2. A sap-spout of approximate conical of shape and having a drip-trough in the bottom of the base end, a flattened portion on the under side of its apex end, and an inlet-opening at the inner end of the flattened portion.

3. A sap-spout of approximately conical form, provided at the top with a permanent cover-flange, at or near the outer end of the spout and extending lengthwise, the flange being provided with an opening, a cover slotted to receive the flange of the spout and provided with bearings, and a pin held removably in the bearings for engaging with the said opening.

4. A sap-spout of approximately conical shape and having a sap-inlet at the apex end of the spout, a trough extending integrally in the bottom of the base end of the spout, a flange on the top of the spout, at the base end thereof and having an opening, and a cover having an offset and provided with a slot to receive the flange of the spout and with a pin for engaging the opening of said flange.

5. A sap-spout of approximately conical shape and made from a single piece of sheet metal, bent to produce a longitudinal seam or joint on the top, the said piece of sheet metal having flange portions, the said flange portion being provided with an opening and means for locking the flange portions together.

6. A sap-spout of approximately conical shape and made from a single piece of sheet metal, bent to produce a longitudinal seam or joint on the top, the said piece of sheet metal having flange portions, and means for locking the flange portions together, the said means consisting of an extension on one of the flange portions, bent over the other flange portion.

7. A sap-spout of approximately conical form, provided at the top with a permanent flange, at or near the outer end of the spout and extending lengthwise, the said flange being provided with an opening, and a cover having a slot to receive the spout-flange and provided with a pin for engaging the opening of the said spout-flange, the cover having depending flanges for engaging the sap-bucket at the sides.

8. A sap-spout provided with a flange on its upper surface at the outer end thereof, said flange being provided with an opening, a cover provided with a slot to receive the spout-flange and with bearings on opposite sides of the slot, and a removable pin adapted to engage the said bearings and the opening of the spout-flange, as set forth.

In testimony whereof I have signed my name to this specification in the presence of two subscribing witnesses.

GUSTAV HENRY GRIMM.

Witnesses:
H. R. BARMEY,
THOMAS H. BROWNE.